UNITED STATES PATENT OFFICE 2,371,955

WELL DRILLING FLUID

Reginald D. Dawson, Berkeley, and Charles F. Blankenhorn, Oakland, Calif., assignors to Shell Development Company, San Francisco, Calif., a corporation of Delaware No Drawing. Application August 31, 1943, Serial No. 500,714

2 Claims. (Cl. 252—8.5)

This invention relates to the drilling of oil and gas wells, and relates more particularly to the use and composition of a rotary drilling fluid.

To carry out its functions, a satisfactory drilling fluid must have a sufficient density or weight to hold down the formation pressure, sufficient plastering or sheath-forming properties to prevent excessive losses of the liquid phase to the formation, sufficient gel-forming and thixotropic properties to maintain weighting material and cuttings in suspension without appreciable settling, and a sufficiently low viscosity to be pumpable without imposing undue stresses on the pumping equipment.

Drilling fluids usually consist of aqueous clay suspensions, to which weighting materials such as limestone or barytes are often added.

The clay imparts to the drilling fluid both its gel structure and its plastering properties. The density of the drilling fluid can be controlled by the addition thereto of a weighting material, and its viscosity by treatment with chemical agents such, for example, as alkali tannates and polyphosphates.

During the process of drilling a well, the above properties of the drilling fluid are subject to deterioration, the usual cause being contamination.

Thus, in drilling through formations of so-called heaving shale, the shale drilled out by the bit of sloughing off the walls of the well is admixed to the drilling fluid, and this contamination causes a steep rise of drilling fluid viscosity. Moreover, the liquid component of an aqueous drilling fluid brings about a swelling of the heaving shale, causing said shale to collapse into the well and to freeze the drilling equipment.

Another source of contamination resides in various brines which are admixed to the drilling fluid when passing through water-bearing layers. The salts of these brines cause a flocculation of the clay, modifying its gel structure and causing a large viscosity increase. These salts furthermore entirely destroy the plastering or sheath-forming properties of even the best clays, such as bentonite, with the result that the drilling fluid loses its ability to form a mudsheath on the walls of the well, whereby large amounts of the fluid are lost into the formation.

Another source of contamination resides in cement which unavoidably becomes admixed to the drilling fluid when drilling is resumed after cementing a casing string, or drilling through a cement plug. Cement causes a flocculation of the clay, and destroys the plastering or sheath-forming properties of the drilling fluid to such an extent that the contaminated fluid often has to be entirely discarded and replaced by a new fluid. The gel structure and the plastering properties of drilling fluids, especially at the temperatures prevailing in deep wells, cannot be restored by chemical treatment.

It is therefore an object of this invention to provide a drilling fluid having good gel-structure and plastering or sheath-forming properties which are not subject to deterioration upon admixture with well brines or with cement.

It is also an object of this invention to provide a drilling fluid which permits drilling through heaving shale formation without causing a swelling and subsequent collapse of the shale into the well.

It is also an object of this invention to provide a drilling fluid whose viscosity is not substantially adversely affected by contamination either with brines, or with shale, said fluid being effective in preventing the disintegration of said shale by the action of the drill bit.

It is also an object of this invention to provide a drilling fluid which combines considerable density or specific gravity with a relatively low content of solid matter carried by the liquid phase, whereby settling effects are minimized even under most unfavorable conditions.

Briefly, the present invention consists in suspending a finely comminuted solid material such as clay, bentonite, porcellanite, etc., and, if desired, a weighting material such as calcium carbonate, limestone, crushed oyster shells, barytes, iron oxide, litharge, etc., or any mixture of any or all of the above listed materials, in an aqueous solution of chloride salts of preferably divalent or trivalent metals such as calcium, magnesium, iron, zinc, etc., which form water-soluble chlorides. Saturated, or substantially saturated solutions, that is, solutions having a high concentration of at least 60 per cent should preferably be used.

To these suspensions there is added cement in amounts sufficiently low to prevent any condition approaching the setting of the mixture, preferably in amounts not exceeding 6 per cent on the total weight of the drilling fluid. The addition of the cement improves the plastering or sheath-forming properties of the mixture by a large factor, which is not subject to appreciable decrease through contamination effects.

In general, it may be stated that the plastering or sheath-forming properties of the present drilling fluid are a function of the total amount of the cement present therein. Since, however, the amount of the cement present therein cannot be raised to a high value without resulting under certain conditions in a setting cement composition, it has been further found that the addition to the present cement-containing drilling fluid of a relatively small quantity, such as 1 to 4 per cent on the total weight of the drilling fluid, of an organic emulsoid colloid, such as starch, will not only again raise by a large factor the sheath-forming properties of said drilling fluid, but will also act to inhibit the setting properties of the cement.

Any standard type of cement may be used for the purposes of the present invention, the analysis of several types of such suitable elements being given by way of illustration:

| Cement | Composition | | | | | | | |
|---|---|---|---|---|---|---|---|---|
| | CaO | Al₂O₃ | Fe₂O₃ | FeO | SiO₂ | MgO | SO₃ | S |
| Portland | 64.0 | 5.5 | 2.6 | | 22.7 | 1.4 | 2.1 | |
| Bauxitland | 65 | 8.1 | 6.0 | | 16.9 | 1.6 | 1.5 | |
| Aluminous | 37.7 | 38.4 | 12.7 | 3.8 | 5.3 | 0.1 | 0.1 | |
| Blast furnace | 60.2 | 7.5 | 1.4 | | 22.6 | 3.5 | 1.3 | 0.5 |
| Slag | 49.0 | 12.8 | | 1.26 | 27.4 | 2.8 | 1.0 | |

The emulsoid colloids which may be used include starch, water-soluble alginates, Irish moss, gelatin, gum, agar-agar, tragacanth, etc. Starch is preferred, and is used in pasted form, pasting being effected by heating with water to a temperature above 80° C., or by cold treatment of the starch in water with a caustic alkali, or by other suitable methods.

The following examples, showing the composition and properties of the present drilling fluid may be given by way of illustration:

EXAMPLE I—DRILLING FLUID A

A drilling fluid of the following composition was prepared:

| | Per cent by weight |
|---|---|
| Water | 40.5 |
| CaCl₂ | 25.5 |
| Clay A | 17.0 |
| Limestone | 17.0 |

The specific gravity of this drilling fluid was 1.70. To test the plastering properties of this mud, it was subjected to a filter test at 90° C. and 300 lbs. per square inch pressure before and after adding thereto cement and/or starch.

Drilling fluid A

| Added material in percent on the total weight of the drilling fluid | | Filter loss in 60 min. in cc. |
|---|---|---|
| Cement | Starch | |
| 0 | 0 | 52.0 |
| 0 | 2.5 | 20.0 |
| 6 | 2.5 | 4.0 |

EXAMPLE II—DRILLING FLUID B

A drilling fluid of the following composition was prepared:

| | Per cent by weight |
|---|---|
| Saturated CaCl₂ solution | 54.0 |
| Clay B | 23.0 |
| Barytes | 23.0 |

The filter losses at 90° C. and 500 lbs. pressure were:

Drilling fluid B

| Added material in percent on the total weight of the drilling fluid | | Filter loss in 60 min. in cc. |
|---|---|---|
| Cement | Starch | |
| 0 | 0 | 53.5 |
| 3 | 0 | 9.0 |
| 3 | 2.5 | 1.5 |
| 5 | 2.5 | Below 1 |

EXAMPLE III—DRILLING FLUID C

A drilling fluid of the following composition was prepared:

| | Per cent by weight |
|---|---|
| Water | 27.3 |
| CaCl₂ | 24.3 |
| Clay C | 21.7 |
| Barytes | 23.2 |

To this mud, 1 per cent of cement and 2.5 per cent of starch, calculated on the total weight of the drilling fluid, were added. The specific gravity of the drilling fluid was 1.95.

The drilling fluid was left standing for 3 days at a temperature of 70° C. After this time, the fluid showed no appreciable settling, and a filter test run under the same conditions as in Examples I and II, gave a filter loss of 3.0 cc. in 60 minutes. After a total standing time of 7 days at a temperature of 70° C., there still was no appreciable settling and a filter test repeated under the same conditions, gave a filter loss of 3.2 cc.

From the above examples it will be seen that the present composition satisfies all the essential requirements of drilling fluids.

Through the use of saturated or substantially saturated calcium chloride solutions, drilling fluids may be obtained having a specific gravity greater by 40 per cent than corresponding drilling fluids compounded with ordinary water. This permits preparation of drilling fluids of relatively high specific gravity without the use of weighting materials which are costly and may tend to settle out, or, alternatively, high specific gravity drilling fluids may be prepared with the use of relatively small amounts of weighting materials.

Heaving shale formations may be drilled through with the present drilling fluid without danger of collapse and freezing of equ'pment, as substantially saturated calcium chloride drilling fluids cause no appreciable swelling of the heaving shale, nor tend to dissolve or leach out any of its component materials. The present drilling fluid, furthermore, does not cause, or minimizes, the disintegration of the bit cuttings, and these can thus be removed by means of a vibrating screen. As a result, the viscosity of the drilling fluid does not increase as rapidly as in the case of an ordinary water base mud. Chemical treatment for viscosity reduction can therefore be sometimes eliminated or substantially decreased.

The present drilling fluids, comprising a saturated salt solution, are insensitive to contamination by brines, and, comprising cement as an addition agent, naturally also to contamination by cement. The extremely high plastering or sheath-forming properties of the present drilling fluids are clearly shown by the examples given hereinabove. These properties are further not subject to deterioration with time at the temperatures usually prevailing in wells, as shown by Example III.

We claim as our invention:

1. In the process of drilling a well by the rotary method, the step of circulating therein a drilling fluid comprising a substantially saturated aqueous solution of calcium chloride of at least 60 per cent concentration, a cement added thereto in amounts from 1 to 6 per cent, and a starch in pasted form added thereto in amounts from 1 to 4 per cent, the percentages of said cement and starch being calculated on the total weight of the drilling fluid.

2. A drilling fluid for drilling wells by the rotary method, comprising a substantially saturated aqueous solution of calcium chloride of at least 60 per cent concentration, a cement added thereto in amounts from 1 to 6 per cent, and a starch in pasted form added thereto in amounts from 1 to 4 per cent, the percentages of said cement and starch being calculated on the total weight of the drilling fluid.

REGINALD D. DAWSON.
CHARLES F. BLANKENHORN.